(12) United States Patent
Fredriksson et al.

(10) Patent No.: US 12,228,444 B2
(45) Date of Patent: Feb. 18, 2025

(54) TANK FEED THROUGH STRUCTURE FOR A RADAR LEVEL GAUGE AND A METHOD OF MANUFACTURING A COUPLING ARRANGEMENT FOR A TANK FEED THROUGH STRUCTURE

(71) Applicant: Rosemount Tank Radar AB, Mölnlycke (SE)

(72) Inventors: Håkan Fredriksson, Linköping (SE); Peter Elmberg, Mölndal (SE); Maria Nordell, Västra Frölunda (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 463 days.

(21) Appl. No.: 17/669,526

(22) Filed: Feb. 11, 2022

(65) Prior Publication Data
US 2022/0276084 A1    Sep. 1, 2022

(30) Foreign Application Priority Data
Mar. 1, 2021  (EP) .................................... 21160047

(51) Int. Cl.
*G01F 23/284* (2006.01)
*G01S 13/88* (2006.01)
*H01Q 1/22* (2006.01)

(52) U.S. Cl.
CPC ............ *G01F 23/284* (2013.01); *G01S 13/88* (2013.01); *H01Q 1/225* (2013.01)

(58) Field of Classification Search
CPC ........ G01F 23/284; G01S 13/88; H01Q 1/225
See application file for complete search history.

(56) References Cited

U.S. PATENT DOCUMENTS

| | | | |
|---|---|---|---|
| 6,386,055 B1 | 5/2002 | Eason | |
| 7,450,055 B2 * | 11/2008 | Eriksson | H01R 13/746 |
| | | | 342/124 |
| 2005/0062483 A1 | 3/2005 | Maier | |
| 2005/0150568 A1 | 7/2005 | Dietmeier | |
| 2006/0225499 A1 | 10/2006 | Gravel et al. | |
| 2008/0307881 A1 | 12/2008 | Schroth | |
| 2013/0314275 A1 * | 11/2013 | Fredriksson | G01S 13/08 |
| | | | 342/124 |

(Continued)

FOREIGN PATENT DOCUMENTS

| | | | |
|---|---|---|---|
| CN | 108680237 A | * | 10/2018 |
| EP | 0928955 A2 | | 7/1999 |
| WO | 0241025 A2 | | 5/2002 |

OTHER PUBLICATIONS

Extended European Search Report from European Patent Application No. 21160047.3, dated Aug. 4, 2021.

*Primary Examiner* — Timothy A Brainard
*Assistant Examiner* — Ismaaeel A. Siddiquee
(74) *Attorney, Agent, or Firm* — Westman, Champlin & Koehler, P.A.

(57) ABSTRACT

The present disclosure relates to a radar level gauge having a tank feed through structure with an elongated transmission member, wherein an inner surface of a dielectric sleeve is in abutment with, and encloses, a radially extending protrusion of the transmission member such as to conform with the shape of the radially extending protrusion. The present disclosure also relates to a method of manufacturing such a tank feed through structure.

13 Claims, 5 Drawing Sheets

(56) References Cited

U.S. PATENT DOCUMENTS

2014/0266862 A1* 9/2014 Fredriksson .......... G01F 23/284
                                                342/124
2014/0266864 A1   9/2014 Fredriksson
2018/0113020 A1* 4/2018 Fredriksson .......... G01F 23/284
2019/0331518 A1* 10/2019 Ohlsson ................ G01F 23/284

* cited by examiner

TANK FEED THROUGH STRUCTURE FOR A RADAR LEVEL GAUGE AND A METHOD OF MANUFACTURING A COUPLING ARRANGEMENT FOR A TANK FEED THROUGH STRUCTURE

CROSS-REFERENCE TO RELATED APPLICATION

This application claims priority to European Patent Application No. 21160047.3, filed Mar. 1, 2021, the content of which is hereby incorporated by reference in its entirety.

TECHNICAL FIELD

The present disclosure relates to a radar level gauge having a tank a feed through structure with an elongated transmission member, wherein an inner surface of a dielectric sleeve is in abutment with, and encloses, a radially extending protrusion of the transmission member such as to conform with the shape of the radially extending protrusion. The present disclosure also relates to a method of manufacturing such a tank feed through structure.

BACKGROUND

A radar level gauge (RLG) is suitably used for measurements of a filling level of products such as process fluids, granular compounds and other materials contained in a tank. The RLG can, for example, comprise a transceiver for transmitting and receiving microwaves, a signal propagating device arranged to direct microwaves towards the surface of the product and to return microwaves reflected by the surface to the transceiver, and processing circuit adapted for determining the filling level based on a relation between microwaves transmitted and received by the transceiver.

The signal propagating device can be arranged in different configurations depending on its purpose of use. One type of signal propagating device is a probe extending into the product in the tank. The emitted signals are guided by the probe, and the RLG is often referred to as a guided wave radar (GWR) level gauge. There are several different types of probes, each adapted for specific center frequencies and with different structural features.

In a GWR level gauge, the probe is connected to the transceiver and directed into the tank via a dielectric sleeve arranged in a tank feed through structure. The tank feed through structure comprises a tank fixing connection which is securely fitted to a tank flange of the tank, and acts as an interface between the tank and the radar level gauge. In order to securely fit the probe to the tank feed structure, a sealing element is arranged between the probe and an inner surface of the dielectric sleeve. In turn, a sealing element is also arranged between an outer surface of the dielectric sleeve and the tank fixing connection.

A conventional sealing element between the probe and the inner surface of the dielectric sleeve is an O-ring. Likewise, an O-ring is often used also for sealing the dielectric sleeve to the tank fixing connection. However, O-ring materials may vary and have different sealing abilities against e.g. chemical resistance, working temperature, or a combination of chemical resistance and working temperature. As such, a specific O-ring material must be chosen depending on the type of application for the GWR. The end costumer thus needs to choose between a great number of sealing elements for their specific application of use.

There is thus a desire to provide a more versatile GWR level gauge which is applicable for various applications of use.

SUMMARY

It is an object of the present disclosure to describe a radar level gauge having an improved sealing versatility for use in different tank environments.

According to a first aspect, this and other objects are achieved by a radar level gauge (RLG) for determining a filling level of a product in a tank using electromagnetic measuring signals, the radar level gauge comprising a transceiver comprising a transmitter for transmitting an electromagnetic transmit signal and a receiver for receiving an electromagnetic echo signal, processing circuitry connected to the transceiver for determining the filling level based on the electromagnetic echo signal, a transmission line probe connected to the transceiver and arranged to extend into the product of the tank, the transmission line probe being adapted to direct the electromagnetic transmit signal towards a surface of the product and to return a reflection from the surface as the electromagnetic echo signal; and a tank feed through structure comprising a tank fixing connection arranged to secure the feed through structure to the tank, the tank fixing connection comprising a through hole with an abutment surface, a dielectric sleeve comprising an outer envelope surface arranged in the through hole of the tank fixing connection and in abutment with the abutment surface, and an inner surface defining a trough hole; and an elongated and axially extending transmission member arranged in the through hole of the dielectric sleeve, the transmission member comprising a first axial end portion connected to the transceiver and a second axial end portion connected to the transmission line probe, wherein an envelope surface of the transmission member comprises at least one radially extending protrusion between the first and second axial end portions, wherein the inner surface of the dielectric sleeve is in abutment with, and encloses, the radially extending protrusion axially above, axially below and on the radially extending protrusion such as to conform with the shape of the at least one radially extending protrusion.

The dielectric sleeve is intended to form part of a coupling arrangement for the transmission line probe. The dielectric sleeve is thus a sort of seal to protect the transmission line probe against thermal and chemical impact from the content in the tank. Accordingly, the dielectric sleeve should be formed by a dielectric filling material which is water repellent as well as resistant against the chemical substances provided in the tank. The dielectric filling material should also preferably not interfere with the operation of the RLG. According to an example embodiment, the dielectric filling material may be formed by PTFE (polytetrafluoroethylene). Other alternatives are also conceivable, such as PEEK (polyether ether ketone), PFA (perflouroalkoxy alkane), FEP (fluorinated ethylene propylene), and PPS (polyphenylene sulfide). With regards to PTFE, this material can withstand relatively high temperatures, i.e. above 150 degrees C., which is preferable. According to an example embodiment, the transmission member may on the other hand be made of a metallic material. Preferably, and according to an example embodiment, the metallic material may be selected from the group of stainless steel and corrosion resistant alloy. According to a still further example embodiment, the corrosion resistant alloy may be Nickel-alloy.

Furthermore, the radially extending protrusion of the envelope surface of the transmission member should be construed as a portion of the extension between the first and second end portions of the transmission member. The inner surface of the dielectric sleeve and the radially extending protrusion are in abutment with each other above, below and on the radially extending protrusion to form a tight fit therebetween.

The present disclosure is based on the insight that an O-ring can be omitted between the transmission member and the dielectric sleeve when providing the transmission member with at least one radially extending protrusion and forming the dielectric sleeve in abutment around this radially extending protrusion. An advantage is thus that the dielectric sleeve, in combination with the structural design of the transmission member form a seal for the inner lead, whereby the GWR level can be used for various number of applications without substantial modifications. Hence, the present disclosure presents a GWR level gauge which, from a sealing perspective, does not have to be modified based on its application of use. The dielectric sleeve will hereby prevent the transmission from excessive axial movements when being used in operation.

According to an example embodiment, the envelope surface of the transmission member may comprise a plurality of alternating circumferential ridges and grooves, wherein the inner surface of the dielectric sleeve is in abutment with, and encloses, the surface formed by the plurality of alternating circumferential ridges and grooves such as to conform with the shape of the ridges and grooves.

Hereby, the sealing characteristics between the transmission member and the dielectric sleeve can be even further improved. The plurality of alternating circumferential ridges and grooves are preferably arranged between the at least one radially extending protrusion and the second portion of the transmission member. The ridges may also preferably comprise a smaller radial extension compared to the radial extension of the at least one radially extending protrusion. Hereby, the at least one radially extending protrusion forms a "hat" above the plurality of the alternating circumferential ridges and grooves.

According to an example embodiment, at least one of the plurality of grooves may be arranged in a dovetail shape in which an axially extending width of the groove is increased towards a radial center of the transmission member.

The dovetail shape enables for an even further improved connection between the transmission member and the dielectric sleeve. In particular, the dovetail shape may, after the assembly process of connecting the dielectric sleeve and the transmission member to each other, enable for the material of the dielectric sleeve to be filled in the cavity formed by the dovetail. In further detail, the dielectric filling member is in abutment with the surfaces formed by the dovetail shaped groove. The dovetail shape hereby maintains the connection between the transmission member and the dielectric sleeve during temperature changes where the material(s) expand and shrink relative to each other.

According to an example embodiment, the plurality of alternating circumferential ridges and grooves are arranged in the form of a serrated surface. The serrated surface is advantageously preventing axial displacement of the transmission member during operation.

According to an example embodiment, the inner surface of the dielectric sleeve may be in abutment with, and enclose, the radially extending protrusion by arranging the dielectric sleeve in pressurized contact with the transmission member and exposing the dielectric sleeve and the transmission member to heating. Preferably, and according to an example embodiment, the inner surface of the dielectric sleeve may be in abutment with, and enclose, the radially extending protrusion by sintering the dielectric sleeve and the transmission member to each other. By arranging the dielectric sleeve in pressurized contact with the transmission member and exposing the assembly to heating, a leak tight joint can be arranged between the two materials. Sintering is a preferred method of manufacturing and is particularly suitable for a dielectric sleeve formed by PTFE.

According to an example embodiment, the radar level gauge may further comprise a spring member arranged to exert an axial compression force between the outer surface of the dielectric sleeve and the abutment surface of the tank fixing structure. The axial compression force generated by the spring member hereby forms a sealing for the interface between the dielectric sleeve and the tank fixing structure. The spring member in conjunction with the abutment connection between the transmission member and the dielectric sleeve thus presents a GWR level gauge which is properly sealed, preventing gas within the tank to leak through the feed through structure.

According to an example embodiment, the abutment surface of the through hole of the tank fixing structure may comprise a seat portion, and wherein the outer envelope surface of the dielectric sleeve comprises a radially extending protrusion having a first surface arranged in abutment with the seat portion.

According to an example embodiment, the spring member may be arranged to exert the compression force against a second surface of the radially extending protrusion of the dielectric sleeve's outer envelope surface. Hereby, the spring member enables for a seal externally of the dielectric sleeve.

According to a second aspect, there is provided a method of manufacturing a coupling arrangement for a tank feed through structure of a transmission line probe radar level gauge, comprising: forming an elongated transmission member with a first axial end portion connectable to a transceiver of the radar level gauge, a second axial end portion connectable to the transmission line probe, and at least one radially extending protrusion between the first and second axial end portions, providing a portion, between the first and second axial end portions, of the transmission member within a dielectric sleeve material such that the portion of the transmission member is encapsulated within the dielectric sleeve material; arranging the dielectric sleeve material in pressurized contact with the elongated transmission member; and heating the dielectric sleeve material and the elongated transmission member to such an extent that an inner surface of the dielectric sleeve abuts and encloses the radially extending protrusion axially above, axially below and on the radially extending protrusion such that the inner surface of the dielectric sleeve conforms with the shape of the at least one radially extending protrusion.

Hereby, the dielectric sleeve will be arranged in abutment with the transmission member to form a process seal between these components.

The dielectric sleeve material may, for example, be provided in the form of a granulated material or a powder material when positioning the transmission member within the material. The dielectric sleeve material may alternatively be arranged by a combination of already sintered material and a powder material when positioning the transmission member within the material. In such a case, the already sintered dielectric sleeve material forms a through hole in which the powder material as well as the transmission member is positioned before exposing the assembly to the heating and pressure process.

The portion of the transmission member is thus encapsulated in the radial direction, whereby the first and second axial end portions should not be encapsulated by the dielectric sleeve material.

According to an example embodiment, heating is performed to such an extent that the dielectric sleeve is sintered with the elongated transmission member.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The present disclosure will be described in more detail with reference to the appended drawings, showing currently preferred embodiments of the radar level gauge, where.

DETAILED DESCRIPTION

Figure 1:
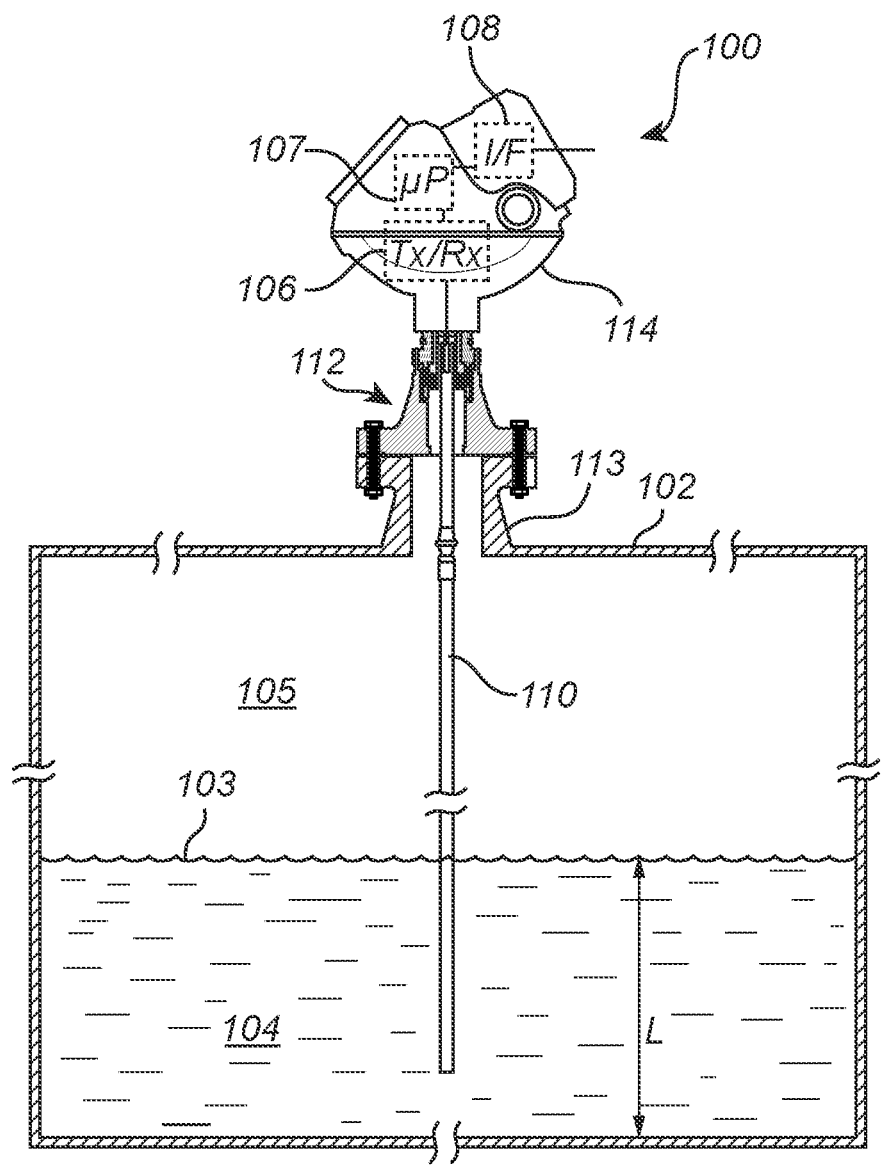
FIG. 1 is a schematic view of a radar level gauge mounted on a tank according to an embodiment.

With reference to FIG. 1, a radar level gauge (RLG) 100 according to an example embodiment is depicted. The RLG 100 is mounted at an upper portion of a tank 102 and arranged to measure e.g. the level L of an interface 103 between two materials 104, 105 in the tank 102, or the distance from the upper portion of the tank 102 to the interface 103 between the two materials. Typically, the first material 104 is a liquid, e.g. gasoline, stored in the tank 102, while the second material 105 is air or another atmosphere in the tank 102. In some applications, the tank is a very large metal tank (diameter in the order of 10 m).

The radar level gauge 100 comprises transceiver circuitry 106, processing circuitry 107 and a signal/power interface 108, all enclosed in a housing 114. The transceiver circuitry 106 is electrically connected to a transmission line probe 110 extending into the tank 102. The transmission line probe 110 is arranged to act as an adapter, transmitting electromagnetic waves into the tank 102 to be reflected by the interface 103, here the surface 103 of the product 104 in the tank 102.

The transceiver circuitry 106 may be a unit capable of transmitting and receiving electromagnetic signals, or may be arranged as a system comprising separate transmitter and receiver units. The elements of the transceiver circuitry 106 are typically implemented in hardware, and form part of an integrated unit normally referred to as a microwave unit. For simplicity, the transceiver circuitry is referred to as the "transceiver" in the following description.

The processing circuitry 108 is configured to determine the distance between a reference position at the top of the tank (such as the passage between the outside and the inside of the tank) and the surface of the tank content by analyzing the transmit signal and the return signal. The processing typically includes generation of a tank signal or "echo curve", The processing circuitry 108 may include a microprocessor, microcontroller, programmable digital signal processor or another programmable device. The processing circuit may also, or instead, include an application specific integrated circuit, a programmable gate array or programmable array logic, a programmable logic device, or a digital signal processor. Where the processing circuitry 108 includes a programmable device such as the microprocessor, microcontroller or programmable digital signal processor mentioned above, the processor may further include computer executable code that controls operation of the programmable device.

The transmission line probe 110 can be a flexible wire suspended between top and bottom of the tank, or can be a rigid probe extending into the tank. It can be a single wire, twin wire, coaxial, or any other type of suitable transmission line. Alternatively, the signal propagating device is a free propagating antenna (not shown in FIG. 1), arranged in the top of the tank. In this case, the transmitted signal must be a microwave signal, e.g. a modulated pulse.

The RLG 100 further comprises a tank feed through structure 120, adapted to provide a preferably pressure sealed passage for electromagnetic signals through the wall of the tank, thereby allowing transmission of transmit signals and return signals between the transceiver circuitry 106 and the transmission line probe 110. The tank feed through structure 112 is fixedly mounted to a tank flange 113, and the transmission line probe 110 and the housing 114 are mechanically secured to the tank feed through structure 112. An example embodiment of the tank feed through structure 112 will be discussed in the following, with reference to FIGS. 2-3.

Figure 2:
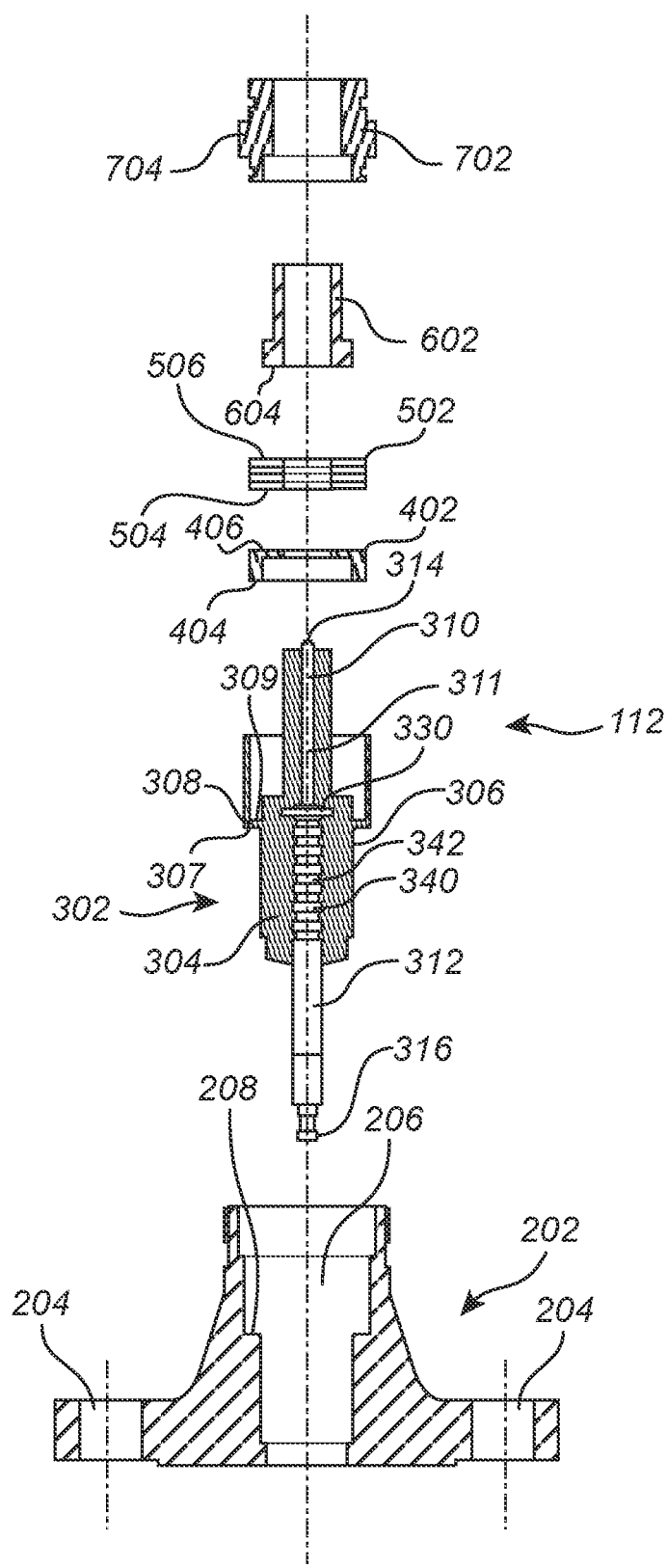
FIG. 2 is an exploded view showing a tank feed through structure according to an example embodiment.
Figure 3:
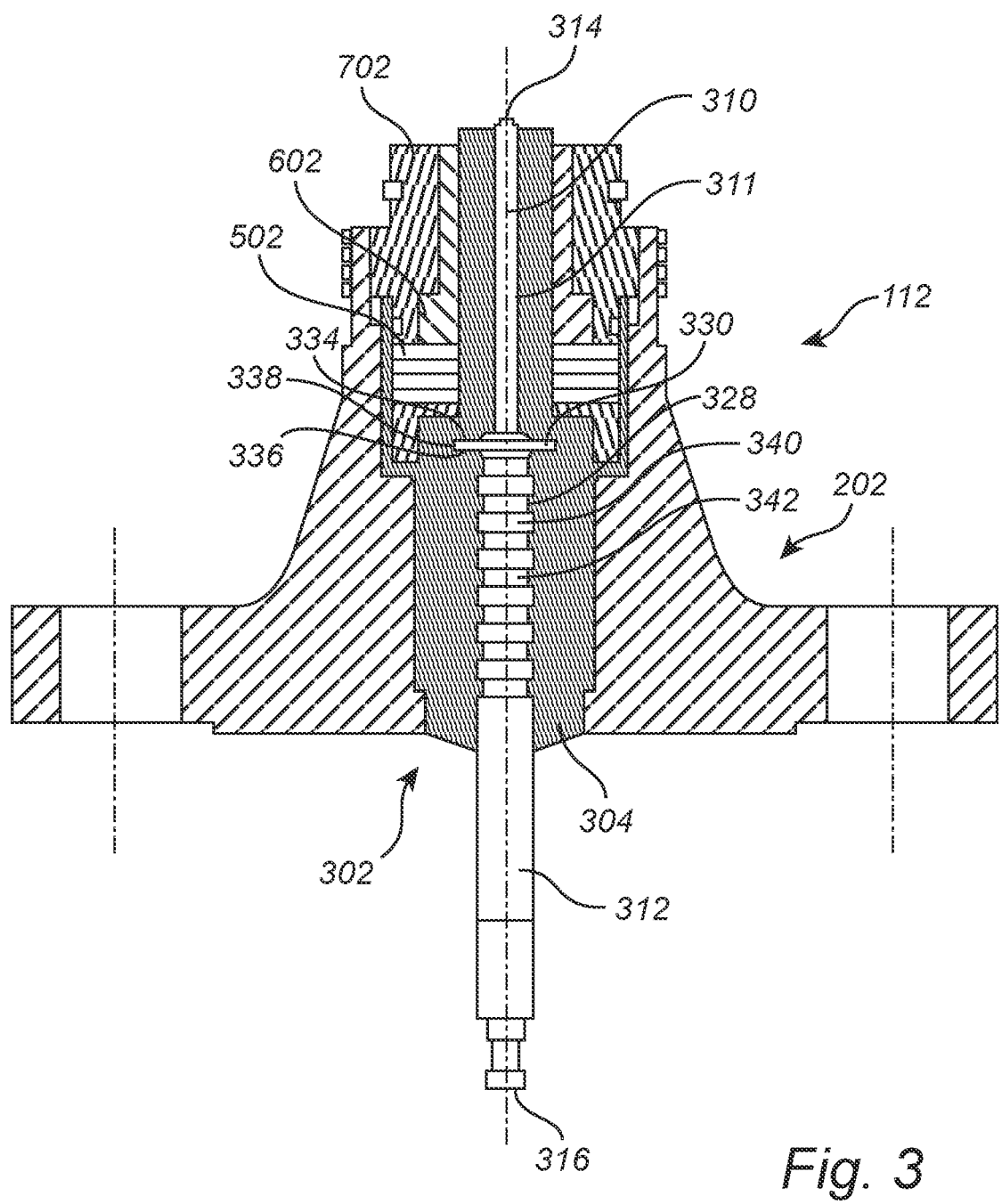
FIG. 3 is a schematic view of the tank feed through structure in FIG. 2 in an assembled configuration according to an example embodiment.

Turning to FIGS. 2-3, which illustrate a detailed example embodiment of the tank feed through structure 112. As can be seen, the tank feed through structure 112 comprises a tank fixing connection 202 which is arranged to be securely fitted to the tank flange 113, preferably using screw or bolt connections. The tank fixing connection 202 comprises holes 204 for receiving such screws or bolts. However, the tank fixing connection 202 may equally as well be connected to the tank flange 113 using other connection means, such as e.g. welding the tank fixing connection 202 to the tank flange 113. The tank fixing connection is preferably made of a metal material, such as steel.

The tank fixing connection 202 further comprises a through hole 206 extending axially through the tank fixing connection 202. The through hole 206 is preferably arranged at a centric position of the tank fixing connection 202 and comprises at least one abutment surface 208, here illustrated as a seat portion 208. According to the example embodiment depicted in FIGS. 2-3, the abutment surface 208 is extending radially inwards towards a center of the through hole 206.

The tank feed through structure 112 further comprises a coupling arrangement 302, which is adapted to provide electromagnetic coupling between the transceiver circuitry 106 and the transmission line probe 110. The coupling arrangement 302 here comprises a dielectric sleeve 304, typically made of a relatively soft dielectric material, such as PTFE. The dielectric sleeve 304 comprises an outer envelope surface 306 which is arranged in the through hole 206 of the tank fixing connection 202. In particular, a radially extending protrusion 308 of the outer envelope surface 306 is arranged in abutment with the abutment surface 208 of the tank fixing connection 202. The radially extending protrusion 308 comprises a first surface 307 arranged in abutment with the seat portion 208 of the tank fixing connection 202, and a second surface 309 facing a seat member 402 as will be described below. The dielectric sleeve 304 further comprises an inner surface 310 defining a through hole 311.

Furthermore, the tank feed through structure 112 comprises an elongated and axially extending transmission member 312 of an electrically conducting material, such as stainless steel or a corrosion resistant alloy. The transmission member 312 is arranged in the through hole 311 of the dielectric sleeve 304 and comprises a first axial end portion 314 connected to the transceiver 106, and a second axial end portion 316 connected to the transmission line probe 110. The interconnection between the transmission member 312 and the dielectric sleeve 304 will be described in further detail below.

Moreover, the tank feed through structure 112 further comprises a seat member 402. The seat member 402 comprises a first, downward facing surface 404 and a second, upward facing surface 406. The first surface 404 is adapted to be in contact with the second, upward facing surface 309 of the radially extending protrusion 308 of the dielectric sleeve 304, while the second surface 406 is adapted to contact a downward facing surface 504 of a spring member 502. The spring member 502 further comprises an upward facing surface 506 adapted to contact a surface 604 of an adaptor sleeve 602 of the tank feed through structure 112.

Finally, the tank feed through structure 112 comprises a metallic locking member 702 adapted to enclose the adaptor sleeve 602. The metallic locking member 702 is arranged to be secured to the tank fixing connection 202 such that the coupling arrangement 302 is sandwiched there between. In the illustrated example, the metallic locking member 702 comprises an outer threading 704 arranged to mesh with a corresponding inner threading of the tank fixing connection 202 so that the metallic locking member 702 can be securely threaded in place. Each one of the seat member 402, the spring member 502, the adaptor sleeve 602 and the metallic locking member 702 comprises an axially extending hole through which the transmission member 312 extends.

The coupling arrangement 302 may be arranged to provide a process seal, i.e. a seal preventing tank atmosphere potentially including product in gas form from leaving the tank. The following will now describe example embodiments of how this process seal is achieved.

As can be seen by the coupling arrangement 302, an envelope surface of the transmission member 312 comprises a first radially extending protruding portion 330 (also merely referred to as a radially extending protrusion) arranged between the first 314 and second 316 axial end portions. The first radially extending protruding portion 330 thus extends radially from a radial center of the transmission member 312, and extends circumferentially around the radial center of the transmission member 312. As is best illustrated in FIG. 3, an inner surface 328 of the dielectric sleeve 304 is in abutment with, and encloses, the first radially extending protrusion 330 axially above 334, axially below 336 and on 338 the first radially extending protrusion 330. The wording "on the radially extending protrusion 330" should thus be construed as on the radial outer end portion of the radially extending protrusion 330. Hereby, the inner surface 328 of the dielectric sleeve 304 conforms with the shape of the at least one radially extending protrusion 330 whereby an inner process seal between these components is achieved without the use of O-rings or other external sealing elements. The first radially extending protrusion 330 is preferably arranged at an axial position between the spring member 502 and the second axial end portion 316, i.e. axially below the spring member 502.

As can be seen in the example embodiment of FIG. 3, the envelope surface 328 of the transmission member 312 further comprises a plurality of alternating ridges 340 and grooves 342. In a similar manner as for the first radially extending protrusion 330, the inner surface 328 of the dielectric sleeve 304 is in abutment with, and encloses, the surface formed by the plurality of alternating circumferential ridges and grooves such as to conform with the shape of the ridges and grooves. Each of the ridges 340 is thus also forming a radially extending protrusion, whereby the inner surface 328 of the dielectric sleeve 304 is in abutment with, and encloses, each of the ridges 340 axially above 334, axially below 336 and on 338 the ridges 340. Likewise, the inner surface 328 of the dielectric sleeve is in abutment with each of the grooves, thereby also conforming with the shape of the grooves. The plurality of ridges 340 and grooves 342 is preferably arranged at an axial position between the first radially extending protrusion 330 and the second axial end portion 316, i.e. axially below the first radially extending protrusion 330.

To arrange the inner surface 328 of the dielectric sleeve 304 in abutment with the first radially extending protrusion 330, as well as with the plurality of alternating ridges 340 and grooves 342, the dielectric sleeve 304 is preferably arranged in pressurized contact with the transmission member 312, whereby the dielectric sleeve and the transmission member is exposed to a heating process. Preferably, and as will be described in further detail below with reference to FIG. 5, the dielectric sleeve and the transmission member are arranged in abutment with each other by exposing the dielectric sleeve and the transmission member to a sintering process.

As described above, the feed through structure 112 comprises the spring member 604. As can be seen in the assembled configuration of FIG. 3, the spring member 502 is sandwiched between the seat member 402 and the adaptor sleeve 602. The seat member 402 is in turn in abutment with the second, upward facing surface 309 of the radially extending protrusion 308 of the dielectric sleeve 304. The spring member 502 is thus exerting an axial compression force onto the dielectric sleeve 304, whereby a compression force is obtained between the outer envelope surface 306 of the dielectric sleeve 304 and the abutment surface 208 of the tank fixing connection 202. Hereby, an outer process seal is obtained between tank fixing connection 202 and the dielectric sleeve 304.

An advantage of the inner and outer process seals is that during a decrease in temperature, the dielectric sleeve material will shrink towards the transmission member 312, thereby providing a sufficient inner process seal between these components as a contact pressure is obtained between the inner surface of the dielectric sleeve and the transmission member 312. During a temperature increase on the other hand, the dielectric sleeve material will expand. However, since the dielectric sleeve 304 is enclosed by the tank fixing connection 202 and exposed to a compression force by the spring member 502, the only expansion direction of the dielectric sleeve is towards the radial center of the feed through structure. As such, also for a situation where the temperature increases, a sufficient inner process seal will be obtained between the dielectric sleeve 304 and the transmission member 312, as a contact pressure between these components will hereby also be provided. Accordingly, arranging the inner surface of the dielectric sleeve in abutment with, and to enclose, the radially extending protrusion axially above, axially below and on the radially extending protrusion, in combination with the spring member 502 serves a combined technical effect whereby an improved process seal for the tank feed through structure is provided.

Figure 4:
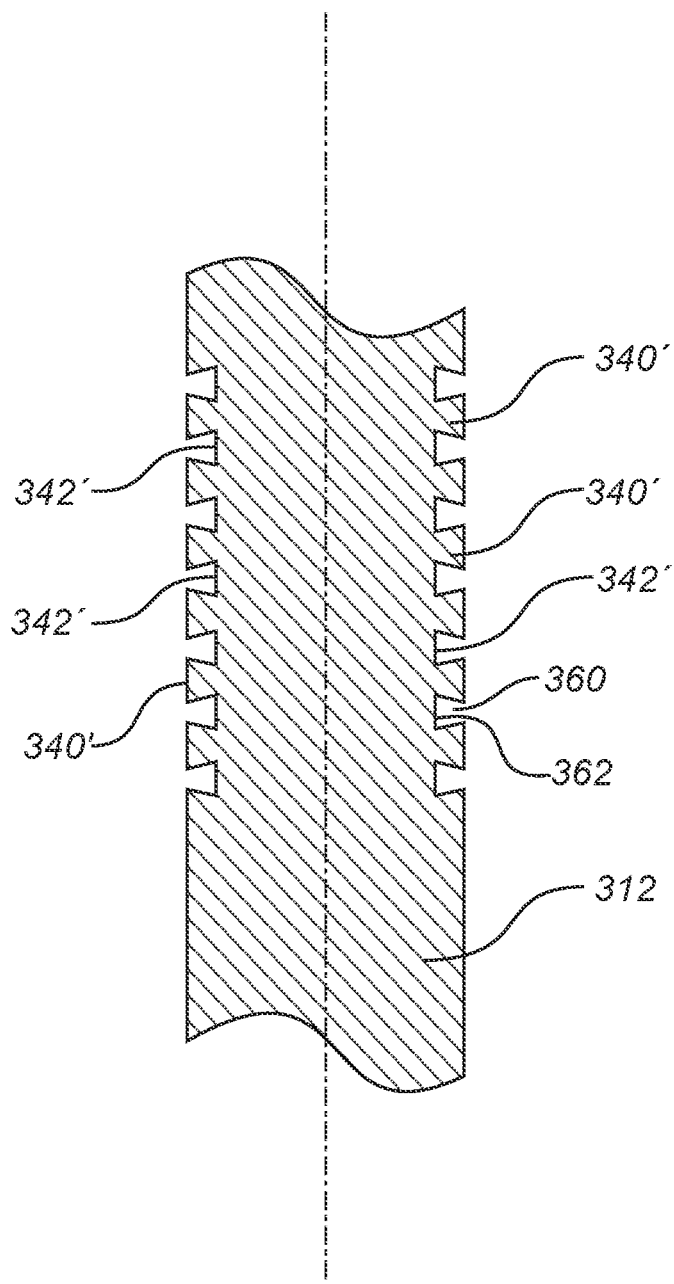
FIG. 4 is a schematic view of transmission member of the tank feed through structure according to an example embodiment.

Turning now to FIG. 4, which illustrates an example embodiment of the radially extending protrusion. In detail, FIG. 4 depicts an alternative example embodiment of the plurality of ridges and grooves depicted in FIGS. 2 and 3. As can be seen in FIG. 4, the ridges 340' and grooves 342' are arranged in the form of a dovetail shape. Thus, a radially outer opening 360 of the groove 342' has a smaller axial width compared to the axial width of the radially inner portion of the groove 342'. Hereby, when the dielectric sleeve 304 and the transmission member 312 are assembled to each other, the dielectric sleeve material will be captured within the dovetail shaped groove forming a tight joint therebetween. The plurality of ridges and grooves may, as a still further alternative be arranged in the form of a serrated surface (not shown).

Figure 5:
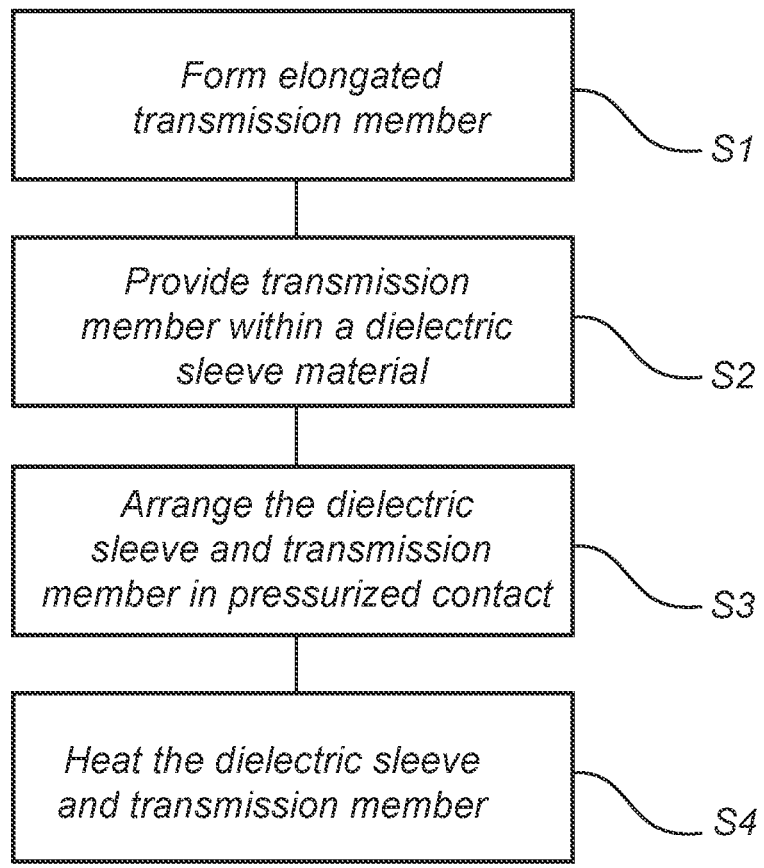
FIG. 5 is a flow chart of a method of manufacturing the tank feed through structure according to an example embodiment.

Reference is now made to FIG. 5, which is an example embodiment depicting a flow chart of a method of manufacturing the coupling arrangement 302 described above.

When manufacturing the coupling arrangement 302, the above described elongated transmission member 312 is formed S1. The transmission member 312 can be formed by, for example, casting or by another conventional manufacturing process for forming a metallic material component. The transmission member 312 is formed to comprise a first 314 and a second 316 axial end portion as well as at least one radially extending protrusion 330 between the first 314 and second 316 axial end portions.

A portion of the transmission member 312 is thereafter provided S2 within a dielectric sleeve material. The first 314 and second 316 axial end portions should however not be provided within the dielectric sleeve material. However, the radially extending portion 330 should form part of the portion which is encapsulated within the dielectric sleeve material. The dielectric sleeve material is thereafter arranged S3 in pressurized contact with the elongated transmission member 312 as well as exposed to heating S4. The inner surface of the dielectric sleeve will hereby abut and enclose the radially extending protrusion in such a way that the inner surface of the dielectric sleeve conforms with the shape of the at least one radially extending protrusion as described above in relation to the first aspect. Preferably, the heating is performed to such an extent that the dielectric sleeve is sintered with the elongated transmission member.

The dielectric sleeve material may, for example, be provided in the form of a granulated or powder material when positioning the transmission member within the material. The dielectric sleeve material may alternatively be arranged by a combination of already sintered material and a powder material when positioning the transmission member within the material. In such a case, the already sintered dielectric sleeve material forms a through hole in which the powder material as well as the transmission member is positioned before exposing the assembly to the heating and pressure process.

The person skilled in the art realizes that the present invention by no means is limited to the preferred embodiments described above. On the contrary, many modifications and variations are possible within the scope of the appended claims.

The invention claimed is:

1. A radar level gauge for determining a filling level of a product in a tank using electromagnetic measuring signals, the radar level gauge comprising:
    a transceiver comprising a transmitter for transmitting an electromagnetic transmit signal and a receiver for receiving an electromagnetic echo signal, processing circuitry connected to the transceiver for determining the filling level based on the electromagnetic echo signal, a transmission line probe connected to the transceiver and arranged to extend into the product of the tank, the transmission line probe being adapted to direct the electromagnetic transmit signal towards a surface of the product and to return a reflection from the surface as the electromagnetic echo signal; and
    a tank feed through structure comprising:
        a tank fixing connection arranged to secure the feed through structure to the tank, the tank fixing connection comprising a through hole with an abutment surface,
        a dielectric sleeve comprising an outer envelope surface arranged in the through hole of the tank fixing connection and in abutment with the abutment surface, and an inner surface defining a through hole; and
        an elongated and axially extending transmission member arranged in the through hole of the dielectric sleeve, the transmission member comprising a first axial end portion connected to the transceiver and a second axial end portion connected to the transmission line probe, wherein an envelope surface of the transmission member comprises at least one radially extending protrusion between the first and second axial end portions, wherein the inner surface of the dielectric sleeve is in abutment with, and encloses, the radially extending protrusion axially above, axially below and on the radially extending protrusion to conform with the shape of the at least one radially extending protrusion, wherein the inner surface of the dielectric sleeve is in abutment with, and encloses, the radially extending protrusion by sintering the dielectric sleeve and the transmission member to each other.

2. The radar level gauge according to claim 1, wherein the envelope surface of the transmission member comprises a plurality of alternating circumferential ridges and grooves, wherein the inner surface of the dielectric sleeve is in abutment with, and encloses, the surface formed by the plurality of alternating circumferential ridges and grooves to conform with the shape of the ridges and grooves.

3. The radar level gauge according to claim 2, wherein at least one of the plurality of grooves is arranged in a dovetail shape in which an axially extending width of the groove is increased towards a radial center of the transmission member.

4. The radar level gauge according to claim 2, wherein the plurality of alternating circumferential ridges and grooves are arranged in the form of a serrated surface.

5. The radar level gauge according to claim 1, wherein the inner surface of the dielectric sleeve is in abutment with, and encloses, the radially extending protrusion by arranging the dielectric sleeve in pressurized contact with the transmission member and exposing the dielectric sleeve and the transmission member to heating.

6. The radar level gauge according to claim 1, further comprising a spring member arranged to exert an axial compression force between the outer surface of the dielectric sleeve and the abutment surface of the tank fixing structure.

7. The radar level gauge according to claim 6, wherein the spring member is arranged to exert the compression force against a second surface of the radially extending protrusion of the dielectric sleeve's outer envelope surface.

8. The radar level gauge according to claim 1, wherein the abutment surface of the through hole of the tank fixing structure comprises a seat portion, and wherein the outer envelope surface of the dielectric sleeve comprises a radially extending protrusion having a first surface arranged in abutment with the seat portion.

9. The radar level gauge according to claim 1, wherein the dielectric sleeve is formed by of a dielectric filling material selected from the group of PTFE (polytetrafluoroethylene), PEEK (polyether ether ketone), PFA (perflouroalkoxy alkane), FEP (fluorinated ethylene propylene), and PPS (polyphenylene sulfide).

10. The radar level gauge according to claim 1, wherein the transmission member is made of a metallic material.

11. The radar level gauge according to claim 10, wherein the metallic material is selected from the group of stainless steel and corrosion resistant alloy.

12. The radar level gauge according to claim 11, wherein the corrosion resistant alloy is Nickel-alloy.

13. A method of manufacturing a coupling arrangement for a tank feed through structure of a transmission line probe radar level gauge, comprising:

forming (S1) an elongated transmission member with a first axial end portion connectable to a transceiver of the radar level gauge, a second axial end portion connectable to the transmission line probe, and at least one radially extending protrusion between the first and second axial end portions, providing (S2) a portion, between the first and second axial end portions, of the transmission member within a dielectric sleeve material such that the portion of the transmission member is encapsulated within the dielectric sleeve material;

arranging (S3) the dielectric sleeve material in pressurized contact with the elongated transmission member; and heating (S4) the dielectric sleeve material and the elongated transmission member to such an extent that an inner surface of the dielectric sleeve abuts and encloses the radially extending protrusion axially above, axially below and on the radially extending protrusion such that the inner surface of the dielectric sleeve conforms with the shape of the at least one radially extending protrusion, wherein the inner surface of the dielectric sleeve is in abutment with, and encloses, the radially extending protrusion by sintering the dielectric sleeve and the transmission member to each other.

* * * * *

UNITED STATES PATENT AND TRADEMARK OFFICE
CERTIFICATE OF CORRECTION

| | | |
|---|---|---|
| PATENT NO. | : 12,228,444 B2 | Page 1 of 1 |
| APPLICATION NO. | : 17/669526 | |
| DATED | : February 18, 2025 | |
| INVENTOR(S) | : Håkan Fredriksson et al. | |

It is certified that error appears in the above-identified patent and that said Letters Patent is hereby corrected as shown below:

On the Title Page

Item [30] replace the Foreign Application Priority Data Application Number "21160047" with --21160047.3--.

Signed and Sealed this
Twenty-fifth Day of March, 2025

Coke Morgan Stewart
*Acting Director of the United States Patent and Trademark Office*